United States Patent
Oohashi

(10) Patent No.: US 9,983,567 B2
(45) Date of Patent: May 29, 2018

(54) NUMERICAL CONTROLLER CAPABLE OF AVOIDING OVERHEAT OF SPINDLE

(71) Applicant: FANUC Corporation, Minamitsuru-gun, Yamanashi (JP)

(72) Inventor: Takumi Oohashi, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 288 days.

(21) Appl. No.: 15/046,618

(22) Filed: Feb. 18, 2016

(65) Prior Publication Data

US 2016/0259320 A1    Sep. 8, 2016

(30) Foreign Application Priority Data

Mar. 2, 2015   (JP) .................................. 2015-40134

(51) Int. Cl.
  G06F 19/00    (2018.01)
  G05B 19/406    (2006.01)
  G05B 19/4062    (2006.01)

(52) U.S. Cl.
  CPC ....... *G05B 19/406* (2013.01); *G05B 19/4062* (2013.01); *G05B 2219/31439* (2013.01); *G05B 2219/34394* (2013.01); *G05B 2219/34477* (2013.01); *G05B 2219/36219* (2013.01); *G05B 2219/42281* (2013.01)

(58) Field of Classification Search
  CPC .......................... G05B 19/406; G05B 19/4062
  USPC ........................................................ 700/177
  See application file for complete search history.

(56) References Cited

U.S. PATENT DOCUMENTS

| | | | |
|---|---|---|---|
| 5,815,399 | A | 9/1998 | Fujibayashi et al. |
| 6,291,959 | B1 | 9/2001 | Yoshida et al. |
| 2012/0109359 | A1 | 5/2012 | Mizuno et al. |
| 2014/0207273 | A1 | 7/2014 | Tsutsumi et al. |

FOREIGN PATENT DOCUMENTS

| | | |
|---|---|---|
| JP | H08-161022 A | 6/1996 |
| JP | 2000-271836 A | 10/2000 |
| JP | 2009-181174 A | 8/2009 |
| JP | 2010-102416 A | 5/2010 |
| JP | 2012-093975 A | 5/2012 |
| JP | 2014-038482 A | 2/2014 |
| JP | 2014-156005 A | 8/2014 |

OTHER PUBLICATIONS

Notification of Reasons for Refusal dated Feb. 17, 2017 in Japanese Patent Application No. 2015-040134 (2 pages) with an English Translation (2 pages).

*Primary Examiner* — Anthony Ho
(74) *Attorney, Agent, or Firm* — Drinker Biddle & Reath LLP

(57) ABSTRACT

A numerical controller estimates a machining continuable time before a currently controlled motor overheats if an output of the motor exceeds a continuous rated output and predicts respective execution times of command blocks and the machining continuable time for each command block, for a currently running block and its subsequent command blocks. Based on these predicted data, the numerical controller identifies a command block (alarm generation block) in which the motor overheats and a command block (stop block) in which driving control can be safely stopped, within the range of command blocks from the currently running command block to the alarm generation block.

1 Claim, 2 Drawing Sheets

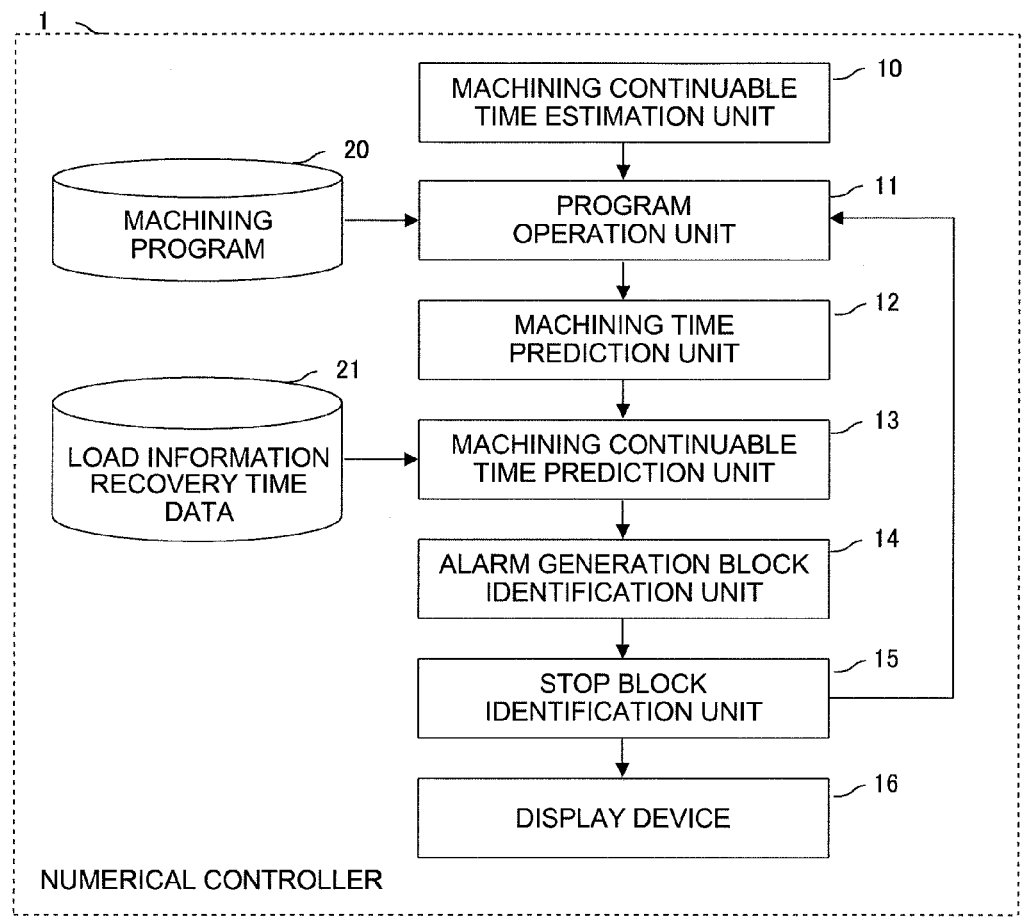
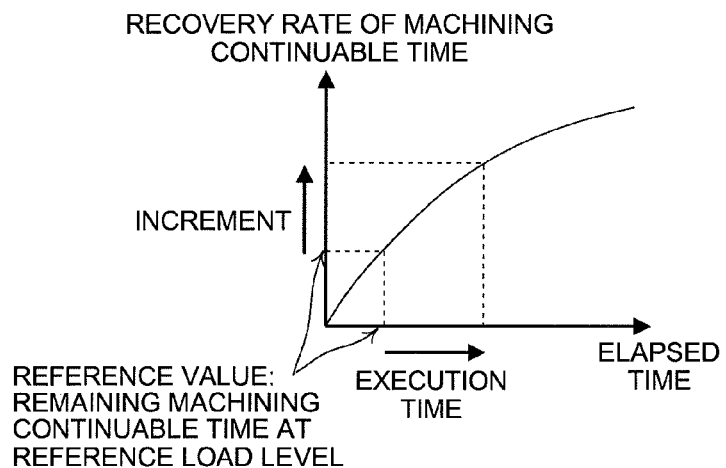

NUMERICAL CONTROLLER CAPABLE OF AVOIDING OVERHEAT OF SPINDLE

RELATED APPLICATION DATA

This application claims priority under 35 U.S.C. § 119 and/or § 365 to Japanese Application No. 2015-40134 filed Mar. 2, 2015, the entire contents is incorporated herein by reference.

BACKGROUND OF THE INVENTION

Field of the Invention

The present invention relates to a numerical controller, and more particularly, to a numerical controller capable of automatically stopping an operation in an appropriate block if a spindle is worked beyond the continuous rated output of a spindle motor.

Description of the Related Art

Conventionally, if a spindle is worked beyond the continuous rated output of a spindle motor, the time (machining continuable time) during which machining can be continued in current cutting conditions is estimated based on the temperature, current value, load data, and the like of the spindle motor. The estimated machining continuable time is displayed on a screen, as shown in FIG. 4. If the spindle is worked beyond this machining continuable time, an overheat alarm is generated to stop an operation.

There is a problem, for example, that a machined surface may be damaged if the operation is stopped in the middle of cutting due to the generation of the overheat alarm. When the continuous rated output is exceeded during the machining, therefore, an operator determines whether or not a program can be performed to the last within the machining continuable time. If it is then determined that the program can be performed only halfway, the operation must be stopped in a block that has no influence on the machining. Normally, however, the block up to which the machining can be performed within the machining continuable time cannot be located, so that it is difficult to determine (or identify) a block in which the operation is stopped.

SUMMARY OF THE INVENTION

Accordingly, the object of the present invention is to provide a numerical controller capable of automatically stopping an operation in an appropriate block before an overheat alarm is generated if a spindle is worked beyond the continuous rated output of a spindle motor.

A numerical controller according to the present invention drivingly controls a motor of a machine tool in accordance with a machining program. The numerical controller comprises a machining continuable time estimation unit configured to estimate and output a machining continuable time before the motor overheats if an output of the motor exceeding a continuous rated output of the motor is continued, a program operation unit configured to execute a command block included in the machining program, thereby drivingly controlling the machining continuable time, and output the currently running block and subsequent command blocks thereof when the machining continuable time is output by the machining continuable time estimation unit, a machining time prediction unit configured to predict respective execution times of command blocks output by the program operation unit, a machining continuable time prediction unit configured to predict the machining continuable time for each of the command blocks, based on the execution times of the command blocks predicted by the machining time prediction unit, an alarm generation block identification unit configured to identify, as an alarm generation block, a command block in which the motor overheats, based on the machining continuable time for each of the command blocks predicted by the machining continuable time prediction unit, a stop block identification unit configured to identify, as a stop block, a command block in which the driving control is allowed to be safely stopped, among the currently running block and the subsequent command blocks thereof and the command blocks preceding the alarm generation block identified by the alarm generation block identification unit, and a display unit configured to display at least the alarm generation block and the stop block. The program operation unit is configured to stop the driving control based on the machining program in the stop block identified by the stop block identification unit.

According to the present invention, an operation is safely stopped in a block for the longest operation time within a machining continuable time, whereby interruption of the operation by an overheat alarm in the middle of cutting can be avoided to prevent a reduction in machining quality.

BRIEF DESCRIPTION OF THE DRAWINGS

The above and other objects and features of the present invention will be obvious from the ensuing description of embodiments with reference to the accompanying drawings, in which:

FIG. 1 is a functional block diagram of a numerical controller according to one embodiment of the present invention;

FIG. 2 is an example of a diagram showing the relationship between the elapsed time and the recovery rate of a machining continuable time;

DETAILED DESCRIPTION OF THE PREFERRED EMBODIMENTS

Figure 3:
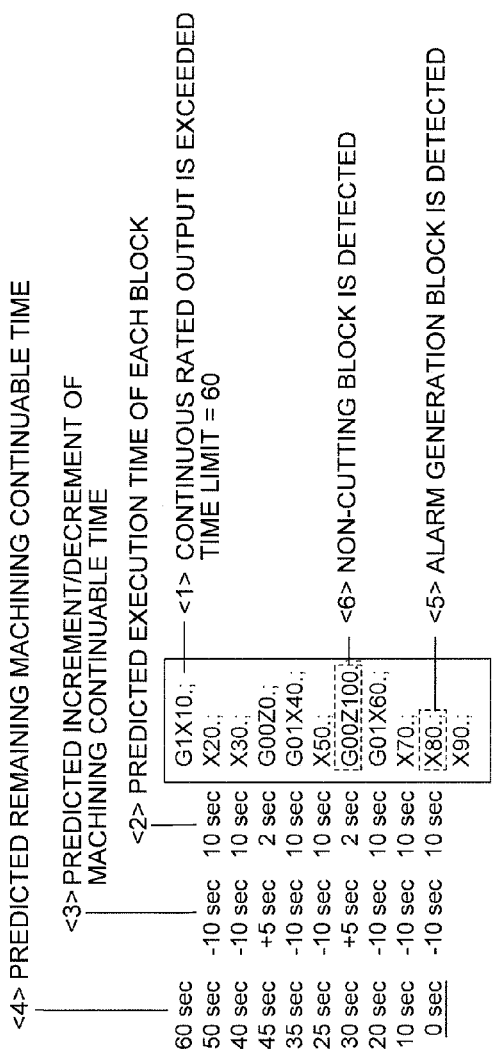
FIG. 3 is a diagram showing a specific example of processing by the numerical controller of FIG. 1 for predicting a stop block.
Figure 4:
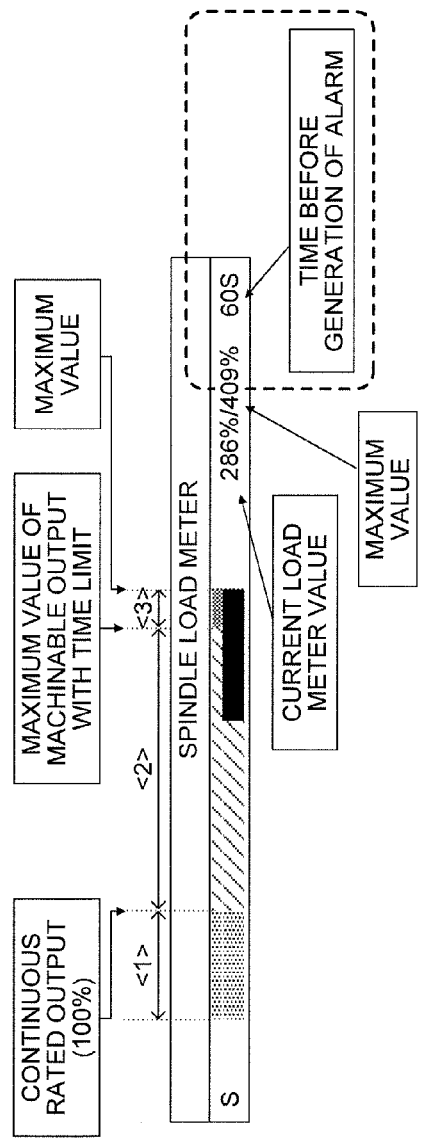
FIG. 4 shows a prior art example of estimation/display of the machining continuable time in the case where a spindle is worked beyond the continuous rated output of a spindle motor.

The present invention provides a numerical controller configured to predict a block in which an overheat alarm is generated, detect (or identify) a block in which an operation can be stopped before the predicted block is reached, and automatically stop the operation at the detected block, in performing machining in excess of the continuous rated output of a spindle motor. An embodiment of the present invention will now be described with reference to the accompanying drawings.

The numerical controller according to the present invention solves the above-described problem by the following method.

If the output of the spindle motor as a controlled object exceeds the continuous rated output during an operation by the numerical controller of the present invention, machining time prediction is performed for a previous block based on a currently running block in the background, and the respective execution times of these blocks are obtained. Then, the increase/decrease of a machining continuable time from the execution times of the blocks and cutting conditions, and a block in which the machining continuable time is zero and the overheat alarm is supposed to be generated is detected. A non-cutting block (rapid traverse block, auxiliary function, etc.) is detected based on the detected block and the operation is stopped at the non-cutting block.

Even after the block in which the operation is stopped is detected (or identified), moreover, the block in which the alarm is generated and the non-cutting block in which the operation can be stopped are detected again if the machining continuable time is changed due to fluctuations of the cutting load during the operation. If parameters, signals, and the like that influence the machining time are changed during the operation, furthermore, the machining time prediction is performed again, and the block in which the alarm is generated and the non-cutting block in which the operation can be stopped are detected.

The block (1) in which the alarm is generated and the non-cutting block (2) in which the operation can be stopped, which are detected in the above-described procedures, are highlighted on a program screen for operators' information.

First, one embodiment of the numerical controller, which solves the problem of the present invention in the above-described procedures, will be described with reference to the functional block diagram of FIG. 1.

A numerical controller 1 comprises a machining continuable time estimation unit 10, program operation unit 11, machining time prediction unit 12, machining continuable time prediction unit 13, alarm generation block identification unit 14, stop block identification unit 15, and display device 16.

The machining continuable time estimation unit 10 monitors the output of a spindle motor (not shown) and estimates the time elapsed before the spindle motor overheats if the motor output exceeding the continuous rated output is continued. This estimated machining continuable time, along with a command for starting a series of processes related to the detection of the stoppable block, is output to the program operation unit 11, which will be described later. The output of the spindle motor can be monitored by a conventional method in which the load current of the motor is detected. Further, the time elapsed before the spindle motor overheats can be estimated by conventional methods disclosed in Japanese Patent Application Laid-Open No. 08-161022 and the like, so that a description of the estimation processing is omitted herein.

Further, the machining continuable time estimation unit 10 predicts the machining continuable time again and outputs the command for starting the series of processes related to the detection of the stoppable block if the machining continuable time is changed due to fluctuations of the cutting load or if the parameters, signals, and the like that influence the machining time are changed even though the detection of the stoppable block is performed and the program operation unit 11 is in such a state that the operation is scheduled to be stopped.

The program operation unit 11 reads and analyzes a machining program 20 stored in a memory or the like, outputs a command to a motor amplifier (not shown) based on the result of the analysis, and drivingly controls the spindle motor attached to a machine tool as a controlled object. On receiving the command for starting the series of processes related to the detection of the stoppable block from the machining continuable time estimation unit 10, moreover, the program operation unit 11 commands the machining time prediction unit 12 (described later) to start processing related to the prediction of interruption of a machining operation and notifies the remaining machining continuable time and a currently running block and its subsequent command blocks of the machining program 20.

On receiving the command from the program operation unit 11, the machining time prediction unit 12 predicts the execution times of the currently running block and the subsequent command blocks of the machining program. The execution time described herein indicates the time elapsed before the processing on the numerical controller 1 and the operation on the machine tool in the driving operation based on the command blocks are completed.

The processing for predicting the execution times of the command blocks by the machining time prediction unit 12 may be performed by any method in which the execution times of the command blocks can be predicted at predetermined or higher speed and accuracy, such as a prediction method based on recording of past measured machining times, machining simulation, or the like. For example, the execution times may be predicted by conventional methods disclosed in Japanese Patent Applications Laid-Open Nos. 2014-038482 and 2012-093975.

The machining continuable time prediction unit 13 predicts an increment or decrement of the machining continuable time as a result of the execution of the command blocks, based on the execution times of the command blocks predicted by the machining time prediction unit 12. Then, the remaining machining continuable time at the start of the execution of each command block is calculated (or predicted) by sequentially adding to or subtracting the predicted increment or decrement of the machining continuable time from the remaining machining continuable time, starting from the currently running command block. The method for calculating the increment/decrement of the machining continuable time varies depending on the type of each command block, cutting or non-cutting.

If the command block is a cutting block, the decrement of the machining continuable time is calculated, assuming that a workpiece is cut in such a state that the output of the spindle motor exceeds the continuous rated output, as in the current situation. The decrement is calculated using a load constant set depending on the level of loads such as the type and conditions (feed rate, spindle speed, etc.) of cutting commanded by the command blocks.

The load constant is a value that is settled depending on the level of loads such as the type and conditions of cutting including the code of a cutting command, feed rate, spindle speed, and the like. The higher the load level, the greater the load constant value is. The load constant is previously obtained by an experiment or the like after setting a predetermined reference and stored in advance in a load information recovery time data 21 for each of the type and conditions of cutting, such as the code of the cutting command, feed rate, spindle speed, and the like.

The machining continuable time prediction unit 13 obtains and gives a load constant of each of command blocks for commanding cutting work, among the currently running block and the subsequent command blocks of the machining program, from the load information recovery time data 21, based on the type and conditions of cutting commanded by the command block concerned. Then, the decrement of the machining continuable time in each block is predicted according to equation (1) as follows:

$$\text{Decrement of machining continuable time} = \text{Execution time of command block} \times (\beta/\alpha), \quad (1)$$

where $\alpha$ is the load constant of the currently running command block and $\beta$ is the load constant of the command block as an object of prediction.

If the command block is a non-cutting block, in contrast, no cutting load is generated for the spindle motor, so that the machining continuable time increases (or is recovered) during the execution of the command block. For the non-cutting block in which no cutting load is generated, therefore, the relationship between the elapsed time and the recovery rate of the machining continuable time is previously obtained by an experiment or the like and stored in advance in the load information recovery time data 21, and the increment of the machining continuable time for each block is predicted based on the obtained relationship.

An example of a method for calculating the recovery rate of the machining continuable time in the non-cutting block will now be described with reference to FIG. 2.

In the graph of FIG. 2, the abscissa represents the elapsed time during which the spindle motor is left without any cutting load since the generation of an overheat alarm, and the ordinate represents the recovery rate of the machining continuable time at a reference load level. A full-line curve represents the relationship between the elapsed time during which the spindle motor is left without any cutting load since the generation of the overheat alarm and the recovery rate of the machining continuable time.

In calculating the recovery rate of the machining continuable time by executing the non-cutting block, the remaining machining continuable time at the start of the execution of the non-cutting block is first converted to the machining continuable time at the reference load level. A reference value of the converted machining continuable time on the recovery axis (ordinate of FIG. 2) is calculated. Then, the machining continuable time for the case in which a time equivalent to the execution time on the elapsed-time axis (abscissa of FIG. 2) has elapsed is obtained from the curve of FIG. 2, and the increment of the obtained machining continuable time relative to the reference value is obtained. The recovery rate of the machining continuable time by the execution of the non-cutting block is obtained by converting the obtained increment to the machining continuable time at the original load level.

The recovery rate of the machining continuable time, during the execution of the non-cutting block can be calculated by previously obtaining, by an experiment or the like, a conversion constant of the machining continuable time corresponding to the load level and the relationship graph shown in FIG. 2 and storing it in advance in the load information recovery time data 21.

The alarm generation block identification unit 14 detects a command block in which the machining continuable time is zero or less, that is, a command block in which the overheat alarm is generated, with reference to the remaining machining continuable time at the start of the execution of each command block predicted by the machining continuable time prediction unit 13.

The stop block identification unit 15 detects a non-cutting block such as a rapid traverse block in the reverse order of execution of the command blocks, starting from the command block in which the overheat alarm is generated and which is detected by the alarm generation block identification unit 14. The detected non-cutting block is displayed as a stop block on the display device 16 and the program operation unit 11 is commanded to stop the operation at the stop block.

If the stop block identification unit 15 cannot detect a block for a safe stop during a time interval from the stop block to the currently running command block, a warning to that effect may be displayed on the display device 16.

A specific example of processing by the numerical controller 1 shown in FIG. 1 for detecting the stoppable block before the generation of the overheat alarm will be described with reference to FIG. 3.

In FIG. 3, <1> is a procedure performed by the machining continuable time estimation unit 10, <2> is a procedure performed by the machining time prediction unit 12, <3> and <4> are procedures performed by the machining continuable time prediction unit 13, <5> is a procedure performed by the alarm generation block identification unit 14, and <6> is a procedure performed by the stop block identification unit 15.

While an embodiment of the present invention has been described herein, the invention is not limited to the above-described embodiment and may be suitably modified and embodied in various forms.

The invention claimed is:

1. A numerical controller configured to drivingly control a motor of a machine tool in accordance with a machining program, the numerical controller comprising:
   a machining continuable time estimation unit configured to estimate and output a machining continuable time before the motor overheats if an output of the motor exceeding a continuous rated output of the motor is continued;
   a program operation unit configured to execute a command block included in the machining program, thereby drivingly controlling the machining continuable time, and output the currently running block and subsequent command blocks thereof when the machining continuable time is output by the machining continuable time estimation unit;
   a machining time prediction unit configured to predict respective execution times of command blocks output by the program operation unit;
   a machining continuable time prediction unit configured to predict the machining continuable time for each of the command blocks, based on the execution times of the command blocks predicted by the machining time prediction unit;
   an alarm generation block identification unit configured to identify, as an alarm generation block, a command block in which the motor overheats, based on the machining continuable time for each of the command blocks predicted by the machining continuable time prediction unit;
   a stop block identification unit configured to identify, as a stop block, a command block in which the driving control is allowed to be safely stopped, among the currently running block and the subsequent command blocks thereof and the command blocks preceding the alarm generation block identified by the alarm generation block identification unit; and
   a display unit configured to display at least the alarm generation block and the stop block,
   wherein the program operation unit is configured to stop the driving control based on the machining program in the stop block identified by the stop block identification unit.

* * * * *